(12) United States Patent
Deshmukh et al.

(10) Patent No.: US 8,091,692 B2
(45) Date of Patent: Jan. 10, 2012

(54) FLUID-FILLED CELLULAR SOLIDS FOR CONTROLLED

(75) Inventors: Suraj S. Deshmukh, Cambridge, MA (US); Gareth H. McKinley, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/378,129

(22) Filed: Mar. 3, 2003

(65) Prior Publication Data

US 2004/0173422 A1 Sep. 9, 2004

(51) Int. Cl.
*F16F 9/53* (2006.01)
(52) U.S. Cl. ............. 188/267.2; 188/268; 267/140.14
(58) Field of Classification Search ....... 188/267–267.2, 188/164, 268; 267/140.14, 140.15
See application file for complete search history.

(56) References Cited

U.S. PATENT DOCUMENTS

| | | | | |
|---|---|---|---|---|
| 2,667,237 A * | 1/1954 | Rabinow | | 188/267 |
| 3,649,426 A * | 3/1972 | Gates, Jr. | | 428/68 |
| 3,672,657 A | 6/1972 | Young et al. | | |
| 5,274,846 A | 1/1994 | Kolsky | | |
| 5,545,128 A | 8/1996 | Hayes et al. | | |
| 5,564,535 A | 10/1996 | Kanianthra | | |
| 5,573,088 A * | 11/1996 | Daniels | | 188/267 |
| 5,645,138 A * | 7/1997 | Tajima et al. | | 180/300 |
| 5,854,143 A * | 12/1998 | Schuster et al. | | 442/135 |
| 5,915,819 A | 6/1999 | Gooding | | |
| 5,946,734 A | 9/1999 | Vogan | | |
| 5,965,249 A * | 10/1999 | Sutton et al. | | 428/304.4 |
| 5,985,168 A | 11/1999 | Phule | | |
| 6,068,249 A * | 5/2000 | Shtarkman | | 267/140.14 |
| 6,148,970 A | 11/2000 | Akad | | |
| 6,202,806 B1 | 3/2001 | Sandrin et al. | | |
| 6,394,239 B1 | 5/2002 | Carlson | | |
| 6,467,099 B2 * | 10/2002 | Dennis et al. | | 2/455 |
| 6,514,001 B1 * | 2/2003 | Yezersky et al. | | 403/109.1 |
| 6,701,529 B1 * | 3/2004 | Rhoades et al. | | 2/2.5 |
| 6,739,657 B2 * | 5/2004 | Heilig et al. | | 297/216.1 |

(Continued)

FOREIGN PATENT DOCUMENTS

DE 3405907 A1 * 8/1985

(Continued)

OTHER PUBLICATIONS

Barnes, H. A. (1989). "Shear-Thickening (Dilatancy) in Suspensions of Nonaggregating Solid Particles Dispersed in Newtonian Liquids." Journal of Rheology, 1989, 329-366, 33(2).

(Continued)

*Primary Examiner* — Xuan Lan Nguyen
(74) *Attorney, Agent, or Firm* — Stephen Otis (57) ABSTRACT

An impact absorber using an energy-absorbing, fluid-impregnated material consisting of a porous interconnected network of solid material forming edges and faces of cells, preferably an open-cell reticulated or partially closed-cell foam, or formed from fibers or other cellular solids. The matrix is impregnated with a field responsive fluid such as a magneto- or electro-rheological fluid, or with a shear-rate responsive fluid such as a dilatant (shear-thickening) fluid. The material is placed under compression during impact, and may be housed within a cylinder and compressed by a piston. The stiffness of the composite material consisting of a matrix filled with a field responsive fluid can be controlled by varying the field intensity and spatial gradients of the applied field to vary the rheological properties of the fluid.

23 Claims, 5 Drawing Sheets

U.S. PATENT DOCUMENTS 7,165,786 B1 * 1/2007 Sha et al. ............... 280/775

FOREIGN PATENT DOCUMENTS

WO     WO 99/49236     9/1999

OTHER PUBLICATIONS

Courtney, W. A. and S. O. Oyadiji (2001). "Preliminary investigations into the mechanical properties of a novel shock absorbing elastomeric composite." Journal of Materials Processing Technology, 2001, 379-386,119(1-3).

Ginder J.M., "Rheology Controlled by Magnetic Fields", Encyclopaedia of Applied Physics, 1996,1-35.

Jakobsson, L., B. Lundell, et al.. "WHIPS—Volvo's Whiplash Protection Study." Accid. Anal. Prev., 2002, 307-19, 32(2).

Klinginberg, D. J., "Magnetorheology: Applications and challenges." A.I.ChE. Journal, 2001, 246-249, 47(2).

* cited by examiner

FLUID-FILLED CELLULAR SOLIDS FOR CONTROLLED

BACKGROUND OF THE INVENTION

Energy absorbing materials and structures are used in a number of applications including vehicles, ballistic armor and helmets, sporting equipment and clothing. Such materials will shunt, convert or dissipate energy via viscosity, friction, visco-elasticity or plasticity. Open or closed cell foams, fibrous materials, springs or piston-cylinder arrangements are generally used as energy-absorbing structures.

The energy absorption capacity of the material is its defining characteristic. If the absorption capacity is too low, the material "bottoms out," providing no additional protection. If the absorption is too high, the force exerted may exceed a critical level and cause damage or injury. Thus, a more compliant material generates low forces and is comfortable, but absorbs very little energy. There is thus a trade-off need to achieve the optimal stiffness property of a given material. In addition, while bulkier, thicker materials will absorb more energy, greater bulk may conflict with design demands for slim, narrow structures.

Energy absorption in occupant protection components for vehicle and passenger safety is a particularly important concern. As an example, the National Highway Traffic Safety Administration (NHTSA) has estimated that there were 805,851 occupants with whiplash injuries annually between 1988 and 1996 in the United States, resulting in a total annual cost of $5.2 billion. Whiplash associated disorders are influenced mainly by properties and positioning of seat and head-restraints, as reported by Jakobsson, Lundell, et al. in "WHIPS—Volvo's Whiplash Protection Study." Accid. Anal. Prev. 32(2): 307-19 (2000). The number and extent of injuries can be reduced by maximizing the amount of energy absorption, by minimizing the occupant acceleration or by reducing the relative movement between the head and the torso. This, however, indicates a possible conflict in the stiffness property of head-restraints and seat back-rests, since a more energy absorbing structure is rigid under everyday shock conditions leading to discomfort.

Similarly, in side crashes, NHTSA simulation studies have shown that structural stiffness and energy management through padding in doors or pillar trims can significantly reduce chest, head or pelvic injuries. Further, in compliance with new legislation, vehicle components must meet impact safety standards. The European Experimental Vehicles Committee Working Group (EEVC WG 17) and European New Car Assessment Program (EURO NCAP) require vehicle designs (exterior parts) to minimize pedestrian injuries due to impact. The coincidence of the adult upper leg impact zone with the child head impact zone indicates again a "conflict of stiffness" problem as described by Courtney and Oyadiji in "Preliminary investigations into the mechanical properties of a novel shock absorbing elastomeric composite," Journal of Materials Processing Technology 119 (1-3): 379-386 (2001). The Federal Motor Vehicle Safety Standard (FMVSS 201/202) further specifies special requirements for the interior parts of the vehicle such as A/B/C pillar trims, head-liners, and knee and side impact foam parts. These impact parts are required to satisfy a number of energy absorption criteria under different impact conditions to reduce injuries to different passengers during a collision. Energy absorbing materials implemented previously usually meet either the child passenger impact criteria or the adult passenger impact criteria but not both sets of criteria.

Fluid-filled cells and absorbent matrices have been used to implement energy absorbing devices. For example, U.S. Pat. Nos. 5,915,819, 5,564,535 and 3,672,657 disclose structures made of a series of fluid-filled cells or reservoirs, wherein energy absorption is achieved by restricting the fluid-flow through orifices or in-between cells and reservoirs. Similarly, International Publication No. WO 99/49236 describes an energy absorbing material wherein the fluid-filled cells are permeable. Energy absorbing pads or bladders which form fluid-filled envelopes or compartments have been employed; for example, U.S. Pat. No. 5,545,128 utilizes a compartments filled with a shear-thickening fluid to form pads for bone fracture prevention. U.S. Pat. No. 6,202,806 describes motion control devices which utilize an absorbent matrix to hold a Theological fluid that is subjected to a magnetic field, the matrix being positioned between two moving members and acting in a shear mode to control the relative sliding, linear or rotary motion of the members.

BRIEF SUMMARY OF THE INVENTION

The present invention takes the form of improved methods and apparatus for absorbing and dissipating impact energy in which a cellular solid or a porous matrix impregnated with a field-responsive or shear-thickening fluid dissipates energy when compressed.

The impact absorber contemplated by the invention comprises a composite material consisting of a cellular solid or a fibrous matrix, impregnated with a fluid, that stiffens under predetermined conditions. The composite material is reversibly or irreversibly compressed in response to an impact to dissipate the energy of the impact The energy absorbing fluid-impregnated material consists of a porous interconnected network of solid material forming edges and faces of cells, preferably an open-cell reticulated or partially closed-cell foam. The network structure can alternatively be formed from fibers or other cellular solids. This matrix is impregnated with a field-responsive fluid such as a magnetorheological or electrorheological fluid whose rheological properties (i.e. viscosity, plasticity or elasticity) may be varied by changing the intensity of an applied magnetic or electric field. Alternatively, a shear-rate responsive fluid such as a dilatant (shear-thickening) fluid can be used to impregnate the cellular matrix. The impregnated material, including both the cellular or fibrous body and the impregnating fluid, is compressed (reversibly or irreversibly) as impact energy is absorbed. During compression, energy is dissipated through bending and buckling of cell walls stiffened by the fluid. Due to the use of low to moderate volume fractions of fluid (preferably 5-60%) in the cellular or fibrous matrix, incompressibility effects are only evident at much higher strains. Additional energy absorption comes as a result of fluid-flow that may be generated in the matrix as the solid is compressed.

In accordance with a further feature of the invention, the energy absorbing properties of the matrix impregnated with a field-responsive fluid can then be varied by controlling and adjusting the intensity and gradient of an electric or magnetic field applied to the material. A cellular or fibrous matrix impregnated with a magneto-rheological fluid can be subjected to a variable magnetic field to control the stiffness and energy absorbing properties of the material. Alternatively, the stiffness of a matrix impregnated with an electro-rheological fluid can be controlled by varying the intensity of an applied electric field. In the case of a shear-thickening fluid impregnating the matrix, the energy absorption is controlled by varying the deformation mechanism and the volume fraction of the fluid.

DETAILED DESCRIPTION OF THE INVENTION

An energy absorbing solid material may be formed by impregnating a cellular solid or a fibrous matrix with either a fluid whose rheological (i.e. flow) properties vary in response to applied fields or rapid deformation. Field-responsive fluids (FRFs) may be characterized as materials that undergo large changes in their rheological properties, such as viscosity, elasticity or plasticity, in response to changes in applied magnetic or electric fields. A shear-thickening or dilatant fluid changes in its rheological properties from a low viscosity to a high viscosity state during impact or high deformation rate conditions.

Figure 1:
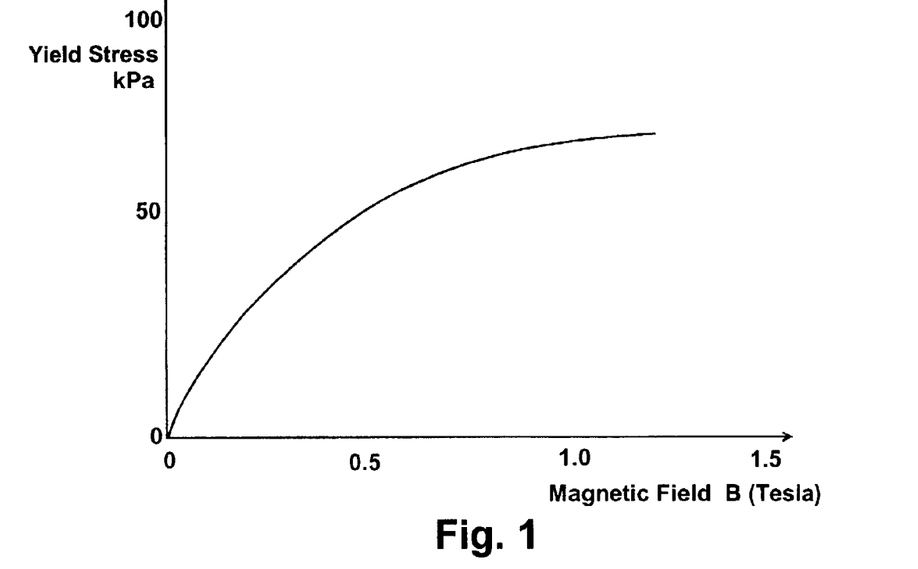
FIG. 1 is a graph depicting the stress response of a typical magneto-rheological (MR) fluid in the presence of a magnetic field.

Magneto-rheological (MR) fluids, as an example of field-responsive fluids, consist of magnetizable particles, typically 10-50% by volume, dispersed in a non-magnetizable carrier fluid such as silicone oil or a viscoplastic base such as blended automobile grease. A number of proprietary additives such as surfactants and thixotropic agents may be added to promote stabilization of particles and lubrication. Typically, the magnetizable particles, e.g. carbonyl iron, are 100 nm to 100 µm in diameter. One such magneto-rheological fluid is described in the U.S. Pat. No. 5,985,168. The MR fluid response is due to magnetization of the particles in the presence of a magnetic field to form fibrous columns of particles along the field direction as described by J. M. Ginder in "Rheology Controlled by Magnetic Fields", Encyclopedia of Applied Physics, pp. 1-35 (1996), and by D. J. Klingenberg in "Magnetorheology: Applications and challenges." A.I.Ch.E. Journal 47(2): 246-249 (2001). These columnar structures need to be disrupted before the fluid can flow and hence the yield stress of the fluid increases with magnetic flux as shown in FIG. 1 which graphically depicts the yield stress response of a typical magneto-rheological (MR) fluid in the presence of a magnetic field. MR fluids reversibly change from a free flowing liquid state to a solid-like state within a few milliseconds, making them ideal for use in energy management structures which must respond to impacts that may last only a few hundreds of milliseconds.

Electro-rheological (ER) fluids exhibit a substantial increase in viscosity when an external electric field is applied. When the electric field is absent, the viscosity of the fluid goes back to the original state. The ER fluids can be classified broadly into a dispersion type and homogenous type. The dispersion type ER fluid consists of a dispersion of dielectric particles in an electrically insulating oil. The dielectric particles are the so-called dispersed phase and the insulating oil is the so-called dispersion medium. Representatives of the homogenous type ER fluid are liquid crystals. Upon an electric field the viscosity coefficient increases. In both cases, the response is fast and reversible. See *Electrorheological Fluids: Modeling and Mathematical Theory* by Michael Ruzicka, ISBN: 3540413855 (Springer-Verlag-2001).

Figure 2:
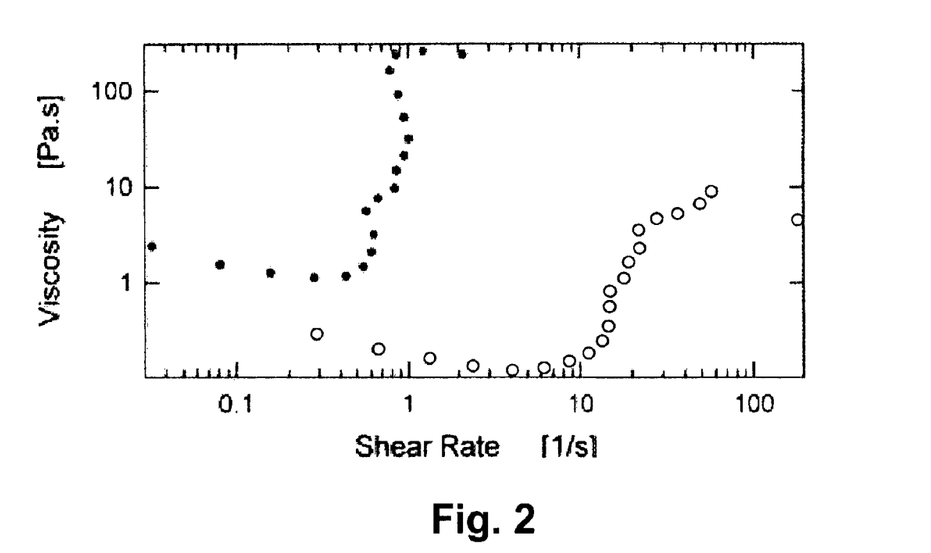
FIG. 2 is a data plot illustrating the viscosity increase with deformation rate for two different concentrations of shear-thickening fluid.

Dilatant (shear-thickening) fluids, on the other hand, show a reversible increase in viscosity with increase of deformation or shear rate. These fluids are stable dispersions of colloidal particles, preferably monodisperse spherical particles, as described by H. A. Barnes in "Shear-Thickening (Dilatancy) in Suspensions of Nonaggregating Solid Particles Dispersed in Newtonian Liquids." Journal of Rheology 33(2): 329-366 (1989). An example of a shear-thickening fluid is a suspension of corn-starch particles in a water/glycerol solvent system at high volume concentrations of approximately 50%. The solution shows extreme shear-thickening with nearly 3-4 orders of magnitude increase in viscosity at higher shear rates. FIG. 2 shows the manner in which the viscosity of a shear-thickening fluid increases with deformation rate for a shear-thickening fluid, corn-starch in water system, at two different concentrations. The upper curve depicted by data points shown as solid spots shows the change in viscosity vs. shear rate for corn-starch in water at a concentration of 53% by weight. The lower curve depicted by the data points indicated by circular spots in FIG. 2 is produced by a higher corn-starch concentration of 56% by weight. The critical deformation rate at which the system switches into the high viscosity state can be adjusted by varying the particle size, volume concentration or other parameters. In accordance with the invention, such dilatant fluids may be used to advantage to fill a cellular or fibrous matrix to make a material which progressively stiffens with increasing deformation rate.

A cellular solid or a porous matrix consists of an interconnected network of cells, made from solid materials like polymers, composites and metals, or fibers, or naturally occurring biomaterials (e.g. cork, wood) and forms a good passive energy absorption material as energy is absorbed as cell walls bend and buckle elastically or plastically. See *Cellular solids: structure and properties* by L. J. Gibson, Cambridge [England], Cambridge University Press (New York 1997). Such cellular solids are currently widely used for packaging purposes and manufacture of impact absorbing parts. Impregnating this dry porous matrix with field-responsive or shear-thickening fluids by suction can easily form an energy absorbing material embodying the present invention. The energy absorbing fluid is subsequently held in and around cells or fibers due to capillary action. During an impact, the energy absorption capacity of the cellular solid is dramatically increased due to the viscous dissipation resulting from the fluid flow in the network of cells or fibers.

Under the action of an external field, the yield stress present in a field-responsive fluid makes the cell walls and edges stiffer and more difficult to bend and buckle. This effective increase in the stiffness property of the composite matrix increases its energy absorption capacity. Using the "drop ball" test apparatus, a standard technique to determine energy absorbed under variable impact conditions, it has been shown that the energy absorbed increases and the displacement of the ball decreases dramatically for an MR fluid-filled reticulated foam as compared to an unfilled foam. The impact of a 3 g aluminum ball with an impact velocity of 5.3 m/s exhibited a rebound velocity of 1.72 m/s for unfilled foam as compared to a rebound velocity of 0.5 m/s for MR fluid-filled foam. The ball came to rest in 800 ms using the unfilled foam but in only 150 ms using the MR fluid-filled foam.

Figure 3:
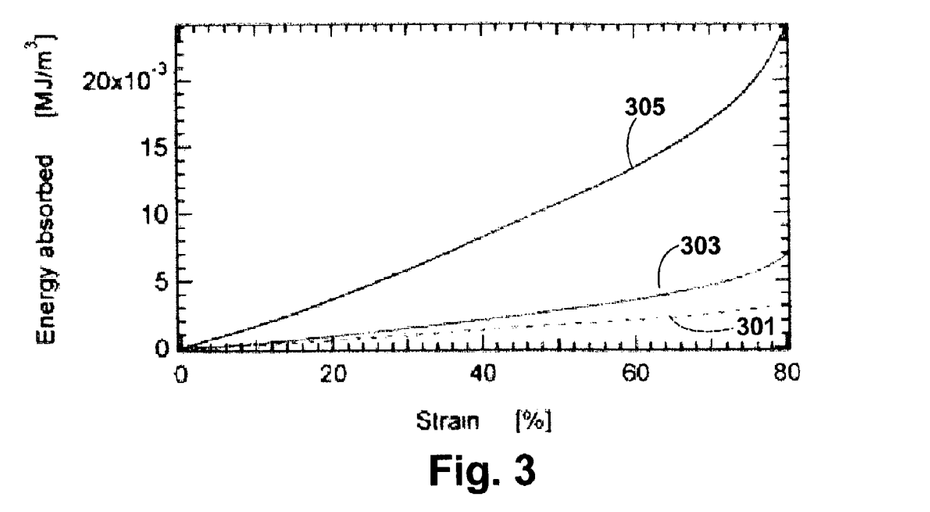
FIG. 3 graphically depicts the variation in absorbed energy of an MR fluid-filled foam subjected to different magnetic field intensities.

When a field-responsive fluid is used to impregnate the matrix, the viscous dissipation term may be controlled by external control of the field strength, permitting "smart" (i.e. adaptive) management of the amount of energy absorbed. FIG. 3 shows the variation in the energy absorption of a MR fluid-filled polyurethane foam as the strength of the applied magnetic field is varied. The lower, dashed line curve 301 graphs the change in energy absorbed vs. the applied strain for foam filled with 16% volume fraction of MRF fluid with no field applied. The middle curve 303 in FIG. 3 shows the variation in energy absorbed when a 0.05 Tesla average magnetic field is applied, and the upper curve 305 shows the energy absorbed when a 0.16 Tesla field is applied. The energy absorption capacity can be actively controlled and enhanced using a magnetic field by a factor of between 1 to 30 times under test conditions.

Figure 4:
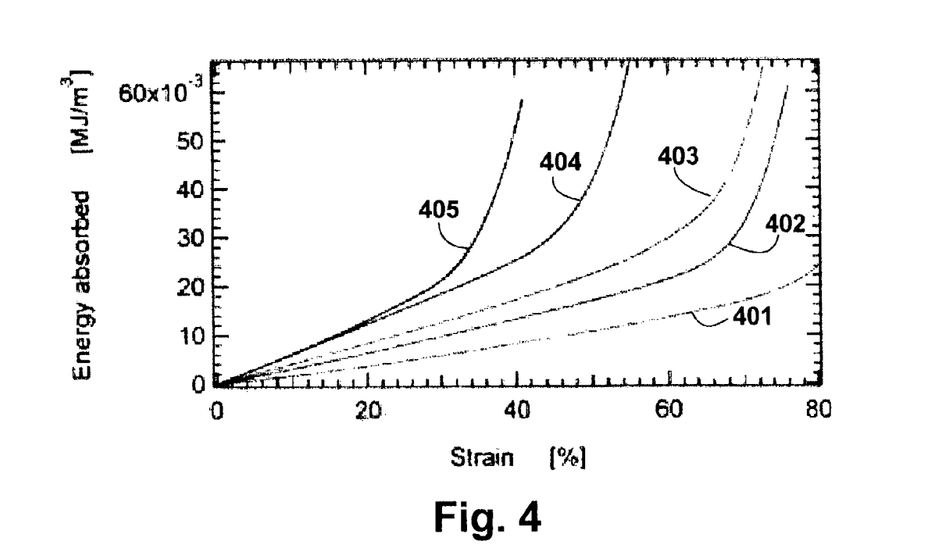
FIG. 4 shows the variation in energy absorbed by a foam impregnated with different concentrations of MR fluid at constant magnetic field intensity.

Further control of the range is possible, since the energy absorption capacity is strongly dependent on the volume fraction of the fluid inside the matrix. The composite matrix stiffens up at lower deformations and energy absorption increases as the fluid volume fraction increases as shown in FIG. 4, which graphs the variation in energy absorbed vs. the volume of MR fluid impregnating a reticulated foam at constant magnetic field intensity of 0.18 Tesla. The five curves 401-405 respectively represent concentrations of MRF of 17%, 29%, 35%, 48% and 60% respectively.

Figure 5:
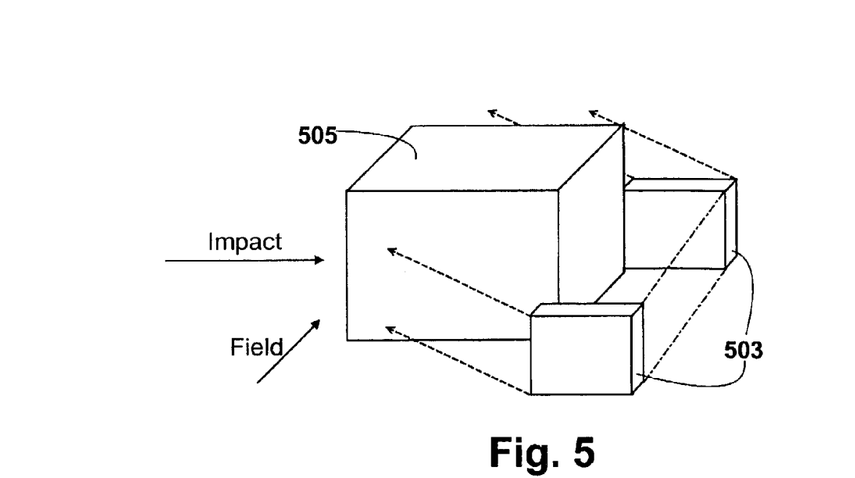
FIG. 5 schematically illustrates an embodiment of the invention wherein an MR impregnated cellular solid undergoes compression with impact, and wherein the field source is moved relative to the cellular solid to vary the applied magnetic field intensity.
Figure 6:
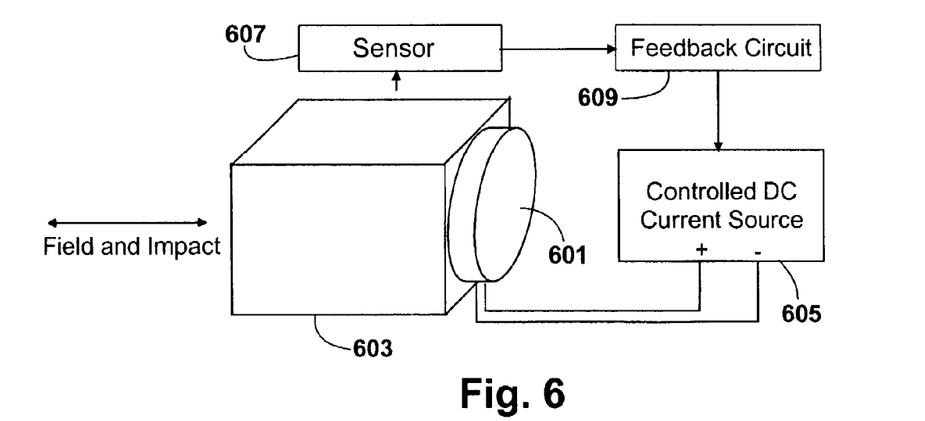
FIG. 6 illustrates a method for varying the energy absorption properties of an MR impregnated cellular solid by varying the current applied to a magnetizing coil.

In accordance with a feature of the invention, a variable field may be applied to a cellular solid or fibrous matrix impregnated with a field-responsive fluid to control the energy absorbing characteristics of the composite material. The arrangements to be described employ a magneto-rheological fluid controlled by a variable magnetic field, but it is to be understood that alternative embodiments may be implemented by applying a variable electric field to a cellular solid or fibrous matrix impregnated with an electro-rheological fluid. The field can be created normal to or along the direction of the impact. A permanent magnet, if used to create the magnetic field in case of MR fluids, can be used in combination with magnetically permeable parts so that the field lines are directed through the energy absorbing material during an impact. Alternatively, as illustrated in FIG. 5, one or more permanent magnets as seen at 503 can simply be moved or oriented with respect to the MR impregnated solid 505 so as to concentrate field lines in the material during impact conditions As shown in FIG. 6, a magnetizing coil 601 can also be used to create a varying magnetic field, and hence variable energy absorption in a MR fluid-filled matrix 603. Preferably, the coil 601 is placed relative to the matrix 603 such that the line of action of impact is along the decreasing magnetic field direction, since work done against the magnetic field gradient adds to the total extent of energy absorption. A solid-state controlled switched current source 605 employing one or more direct current switching transistors or SCRs (silicon controlled rectifiers) can be used to send one or more controlled, high-current pulses through the coil in anticipation of, or in response to, an impact or any other event producing energy to be dissipated. The ability to rapidly increase the stiffness of the impregnated material is particularly useful in case of a vehicle crash, since the time of the event is small but a high amount of energy absorption is required over this small time. A motion or deformation sensor illustrated at 607 may be connected through a feedback circuit 609 to automatically apply a field whose intensity is directly related to the impact strength. The motion or deformation sensor 607 and the feedback circuit 609 may be employed to sense the rate of energy dissipation or the impact intensity to rapidly and automatically control the impact absorption properties of the fluid impregnated material 603.

In the arrangement shown in FIG. 5, the applied field is perpendicular to the line of action of force whereas the field-generating device illustrated in FIG. 6 produces a field parallel to the impact direction.

As further illustrated in FIGS. 7-10, a cylinder, which houses a field-responsive or shear-thickening fluid-filled matrix, may be used in combination with a piston which compresses the material during impact. The viscous dissipation due to flow of the fluid through orifices or holes in the piston or cylinder arrangement may supplement the energy absorption due to the fluid flow inside the solid or fibrous network.

Figure 7:
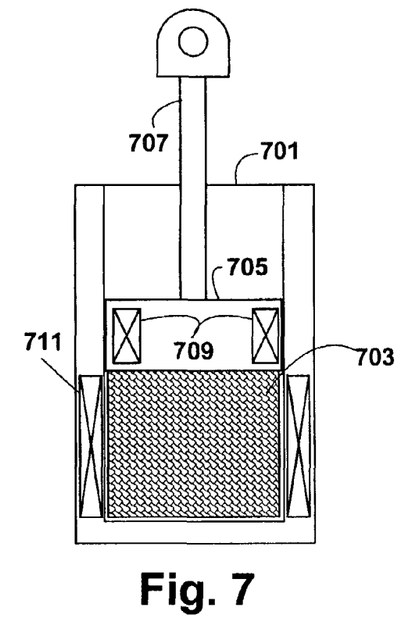
FIGS. 7 to 10 illustrate four alternative arrangements in which the MR impregnated cellular solid is housed within a cylinder and compressed by a piston.

As seen in FIG. 7, a cylinder 701 contains a fluid-filled cellular or fibrous matrix 703. Piston 705 connected to a pushrod 707 that compresses the fluid-filed matrix 703 during impact. A first magnetic coil 709 within the piston 705 and a second magnetic coil 711 within the walls of the cylinder 701 vary the impact response of the cylinder by applying a controlled magnet field to the matrix 703 to vary its stiffness during the impact.

Figure 8:
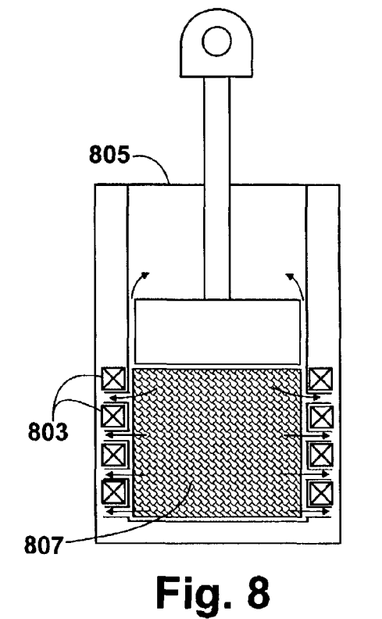

An alternative embodiment shown in FIG. 8 employs a plurality of axially spaced coils seen at 803 within the walls of a cylinder 805 that contains a fluid-filled matrix 807. Orifices through the cylinder wall between the coils 803 permit restricted fluid flow from the compressed matrix through the orifices to provide additional viscous energy dissipation.

Figure 9:
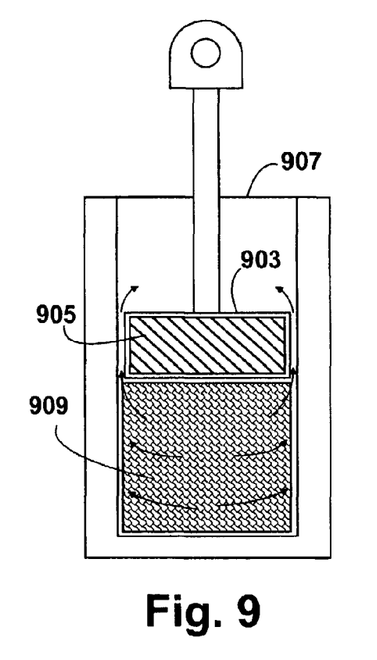

In the further embodiment shown in FIG. 9, the piston 903 carries a permanent magnet 905. The outside diameter of the piston 903 is smaller than the inside diameter of the cylinder 907 that contains the compressible fluid filled matrix 909, providing a restricted passageway through which fluid can flow between the piston 903 and the cylinder 907 during compression, thereby providing viscous energy dissipation which supplements the dissipation in the fluid-filled matrix 909. It should be understood, however, that active or adaptive control can be achieved even without outward fluid flow, for example, when strains are small.

Figure 10:
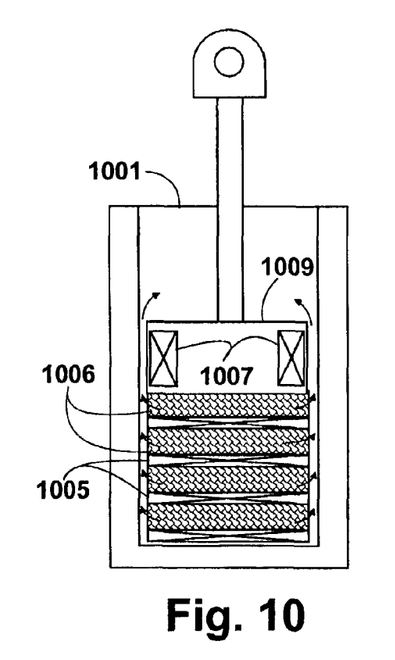

FIG. 10 shows still another embodiment in which the cylinder 1001 houses stacked layers, each layer consisting of a magnetizing coil 1005 and a cellular or fibrous solid block 1006 impregnated with an MR fluid. An additional magnetizing coil 1007 is housed in the piston 1009. As in the arrangement of FIG. 9, MR fluid, if it is, expelled from the impregnated blocks 1006 flows in the gap between the inner walls of cylinder 1001 and the smaller piston 1009.

Figure 11:
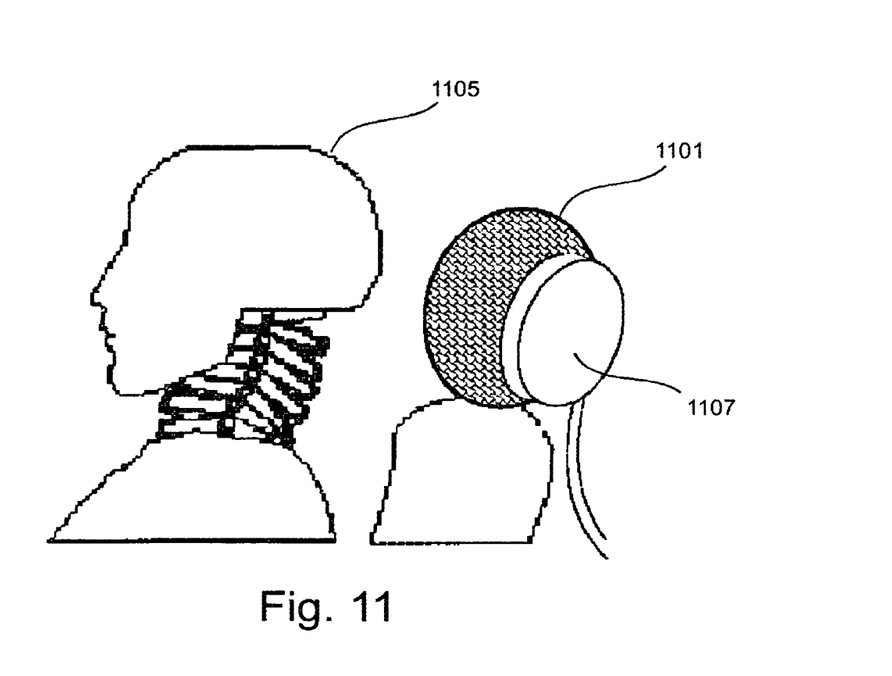
FIG. 11 depicts a passenger headrest which utilizes an MR impregnated cellular solid to absorb impact.

An exemplary use for the invention is illustrated in FIG. 11 which shows an impact absorbing passenger headrest 1101 fitted to the top of a passenger seat 1101 to restrain the rearward movement of the passenger's head 1105 in the event of a rear impact collision with the vehicle. The headrest 1101 is formed from a cellular foam impregnated with a field responsive MR fluid whose rheological properties are altered by energizing the magnetizing coil 1107 at the time of impact to control the impact absorbing properties of the headrest 1101. During a rear-end crash, the otherwise comfortable and compliant headrest 1101 is transformed into a rigid, high energy-absorbing material by the application of a field from the magnetizing coil 1107.

Numerous other components of a vehicle may be advantageously constructed using a suitably packaged foam impregnated with a field responsive fluid. Applications of the present invention include components protecting pedestrians and passengers against impact, such as pillar trims, knee bolsters, bumper inserts, armrests etc. By applying a variable field to the impregnated foam component, the energy absorption capacities of these components may be varied to satisfy both the child and adult impact criteria (in accordance with the new FMVSS regulations), and hence is an effective solution to the conflict of stiffness' problem created by the need to protect both adults and children.

It is to be understood that the methods and apparatus which have been described are merely illustrative applications of the principles of the invention. Numerous modifications may be made to the arrangements described without departing from the true spirit and scope of the invention.

What is claimed is:

1. Apparatus comprising:
a composite material consisting of a cellular solid or a fibrous matrix forming an interconnected network of cells, impregnated with a magnetorheological or electrorheological fluid that stiffens under predetermined conditions, said composite material being adapted to be compressed during an impact to dissipate energy of said impact, and said network of cells being located entirely within a rigid housing,
wherein said compression occurs as a piston moves within said rigid housing toward, and relative to, said composite material.

2. Apparatus as set forth in claim 1 wherein at least one rheological property of said fluid changes when subjected to a magnetic field.

3. Apparatus as set forth in claim 2 including an electromagnet for creating and varying said magnetic field.

4. Apparatus as set forth in claim 3 including a motion or deformation sensor and a feedback circuit for controlling the intensity of said magnetic field.

5. Apparatus as set forth in claim 2 wherein a magnet is adapted to create said magnetic field that is substantially perpendicular to the line of action of force of said impact.

6. Apparatus as set forth in claim 2 including a permanent magnet adapted to be moved to vary said magnetic field.

7. Apparatus as set forth in claim 2 wherein a magnet is adapted to create said magnetic field substantially parallel to the direction of said impact.

8. Apparatus as set forth in claim 1 wherein at least one rheological property of said fluid changes when subjected to an electric field.

9. Apparatus comprising a compressible composite material consisting of a cellular solid or a fibrous matrix forming an interconnected network of cells impregnated with a field-responsive or shear-thickening fluid, which composite material includes one or more structures adapted for bending or buckling during compression of said composite material, a housing for retaining said composite material in a confined space, which housing has one or more restricted passageways for permitting a limited flow of said fluid to exit said housing when said material is so compressed, wherein said compression occurs as a piston moves within said housing toward, and relative to, said composite material in said confined space and as said housing remains rigidly unbending.

10. Apparatus as set forth in claim 9 wherein the viscosity of said fluid changes when subjected to a magnetic field.

11. Apparatus as set forth in claim 10 including a magnet for creating and varying said magnetic field, to vary at least one rheological property of said fluid.

12. Apparatus as set forth in claim 11 further comprising a motion or deformation sensor and a feedback circuit for controlling the impact absorption properties of said fluid.

13. Apparatus as set forth in claim 11, wherein said magnet comprises a magnetic coil.

14. Apparatus as set forth in claim 11, wherein said magnet comprises a permanent magnet adapted to be moved or oriented to vary said magnetic field.

15. Apparatus as set forth in claim 9 wherein the viscosity of said fluid changes when subjected to an electric field.

16. Apparatus as set forth in claim 9 wherein the viscosity of said fluid increases with an increase in shear rate or deformation rate.

17. An impact absorber comprising: a compressible composite material consisting of a cellular solid or a fibrous matrix forming an interconnected network of cells impregnated with a magnetorheological or electrorheological fluid that stiffens under predetermined conditions, a rigid cylinder, and a piston mounted for axial movement within said cylinder for compressing said composite material in response to an impact to dissipate energy of said impact, said network of cells being located entirely within said cylinder, and said axial movement of said piston being toward, and relative to, said impact absorber when said compression occurs.

18. An impact absorber as set forth in claim 17 wherein at least one rheological property of said fluid changes when subjected to a magnetic field.

19. An impact absorber as set forth in claim 17 wherein said fluid comprises a magneto-rheological fluid and wherein said impact absorber includes a magnet for creating a variable magnetic field.

20. An impact absorber as set forth in claim 19 including a detector for sensing the rate of deformation of said composite material and a feedback circuit for controlling the intensity of said magnetic field, to vary at least one rheological property of said fluid in response to said magnitude.

21. An impact absorber as set forth in claim 19 including means for controlling the intensity of said magnetic field to vary the rheological properties of said fluid.

22. An impact absorber as set forth in claim 17 further comprising one or more restricted passageways for permitting a limited flow of said fluid to exit said compression chamber when said composite material is compressed to further dissipate the energy of said impact.

23. An impact absorber as set forth in claim 22 wherein at least one rheological property of said fluid changes when subjected to an electrical field.

* * * * *